Dec. 8, 1925.
C. BORNMANN
BOX CAMERA
Filed Oct. 31, 1922
1,564,821
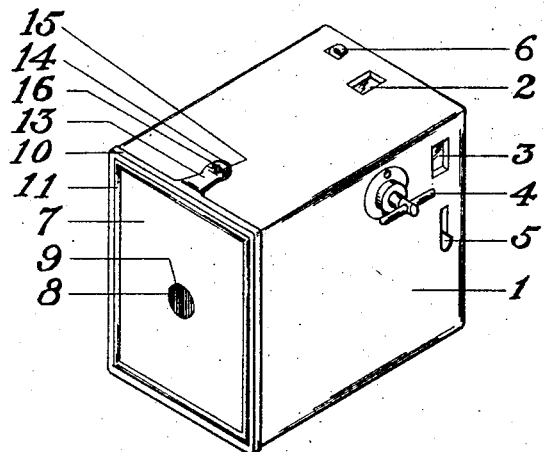
Fig. 1
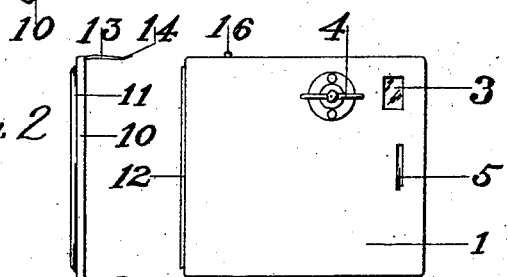
Fig. 2
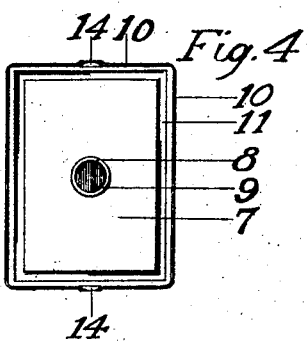
Fig. 3
Fig. 4
INVENTOR
CARL BORNMANN
BY
Philip S. Hopkins
ATTORNEY Patented Dec. 8, 1925.

1,564,821

UNITED STATES PATENT OFFICE.

CARL BORNMANN, OF BINGHAMTON, NEW YORK, ASSIGNOR, BY MESNE ASSIGNMENTS, TO ANSCO PHOTOPRODUCTS, INC., OF NEW YORK, N. Y., A CORPORATION OF NEW YORK.

BOX CAMERA.

Application filed October 31, 1922. Serial No. 598,149.

*To all whom it may concern:*

Be it known that I, CARL BORNMANN, a citizen of the United States, and a resident in the city of Binghamton, county of Broome, and State of New York, have invented a new and useful Improvement in Box Cameras, of which the following is a description, reference being had to the accompanying drawings, in which like reference numerals indicate like parts.

My invention relates to box cameras and has for its principal object the provision of a removable back for cameras of this character.

A further object is to construct my improved back entirely of one piece of sheet metal such as brass, aluminum or tin, which is readily removable, and when secured in place forms a compact and attractive cover for the back of a camera.

It is also an object to form this back in a manner to provide a light trap for the camera which positively excludes the entrance of any light therearound.

A still further object is to provide this improved camera back with securing means to fasten the same on the camera, such securing means forming a part of and being integral with said back.

Another object is to so construct the camera back that it may be placed on the camera regardless of which end of said back is up or down, that is to say the back fits snugly on the camera whether in either of its reversed positions.

Other objects and advantages in details of construction and operation will be apparent as the description proceeds.

In the drawings:

Figure 1 is a perspective view of a box camera showing my improved back in place.

Figure 2 is a side view of the camera with the back exploded therefrom.

Figure 3 is a face view of the outside of said back.

Figure 4 is a face view of the inner side thereof.

Referring to the drawings, 1 indicates a box camera of well known construction having finder openings 2 and 3, winding key 4, shutter lever 5, and time exposure control 6. These parts are the well known equipment of any box camera and bear no particular relation to my present invention.

7 indicates generally my improved camera back which is provided centrally thereof with an aperture 8, covered with red glass or celluloid indicated at 9. This window is the ordinary peep-hole through which the indications on the film covering may be viewed.

The back 7 is provided around the edges thereof with an inturned flange 10 which fits snugly over the sides of the camera as shown clearly in Figure 1. A groove 11 is stamped or otherwise formed around the edges of the back. This groove is adapted to receive a flange 12 carried by the camera and projecting slightly from the rear thereof (see Figure 2). The flange 12 cooperating with the groove 11 provide a very positive and efficient light trap when the back is secured in place upon the camera. As is well known, actinic rays of light travel only in a straight line unless reflected from some surface. Since the camera back 7 and the camera, including the flange 12, are black in color and afford no reflecting surfaces, it will be readily seen that by this tongue or flange and groove construction, all light is effectively excluded from the interior of the camera from around the edges thereof.

At the center of the upper and lower flanges 10, and projecting inwardly therefrom, are spring tongues indicated at 13. These tongues are preferably an integral part of said back. The free ends of these tongues are bent up slightly as shown at 14 to form a finger piece which facilitates the removability of the back from the camera.

Mounted on the top and bottom of the box camera, in position to receive the fingers 13 which are apertured as shown at 15, are lugs 16. The fingers 13 being of spring metal, are slightly under tension and readily snap over the lugs 16 which hold the back securely in place.

It will thus be seen that I have provided a new and improved camera back which may be placed on a camera with equal facility whether one end or the other thereof is up; in other words, the back may be reversed end for end and yet by virtue of the coordination of parts just described, a tight and secure fit of the same will be assured.

It will also be understood from the foregoing description that by virtue of the back being constructed in one piece, cheapness in manufacture and simplification of parts will be effected.

No detailed description of the operation of the device is deemed necessary since the improvement is so simple in its nature and will be readily understood from the foregoing description taken in connection with the drawings.

While the embodiment illustrated and herein described is the preferred form of my invention, it is to be understood that the same is susceptible to various changes in detail of construction and parts, and I do not, therefore, limit myself to the exact form as shown other than by the appended claim.

I claim:

In combination with a camera, a box, a one piece removable back for said box including flanges for embracing the edges of said box, a light excluding rib formed adjacent each edge of said back, resilient securing fingers formed integral with said back, each finger being provided with an opening and an upturned end for easy manipulation, and means on said box engaging in said opening whereby said back is securely held on said box.

CARL BORNMANN.